United States Patent [19]

Leca et al.

[11] Patent Number: 5,279,883

[45] Date of Patent: Jan. 18, 1994

[54] THERMOFORMED POLY (METHYL METHACRYLATE) SHEETS WITH PROTECTIVE FILM

[75] Inventors: Jean P. Leca, Mantes la Jolie; Jean Y. Barbin, Etrepagny, both of France

[73] Assignee: Norsolor

[21] Appl. No.: 942,369

[22] Filed: Sep. 9, 1992

Related U.S. Application Data

[63] Continuation of Ser. No. 817,957, Jan. 8, 1992, abandoned, which is a continuation of Ser. No. 675,055, Mar. 25, 1991, abandoned, which is a continuation of Ser. No. 394,087, Aug. 15, 1989, abandoned.

[30] Foreign Application Priority Data

Aug. 17, 1988 [FR] France ............... 88 10949

[51] Int. Cl.⁵ .................... B29C 51/14; B32B 27/30
[52] U.S. Cl. .................... 428/174; 428/215; 428/218; 428/516; 428/519; 428/520; 428/352; 428/42
[58] Field of Search ............... 428/174, 215, 218, 516, 428/519, 520, 352, 42

[56] References Cited

U.S. PATENT DOCUMENTS

| | | | |
|---|---|---|---|
| 2,648,099 | 4/1950 | Dunmire | 264/544 |
| 4,141,771 | 2/1979 | Barker et al. | 156/222 |
| 4,220,683 | 9/1980 | Barker et al. | 428/520 X |
| 4,367,312 | 1/1983 | Bontinck et al. | 525/98 X |
| 4,499,130 | 2/1985 | Questel et al. | 428/43 |
| 4,800,115 | 1/1989 | Havens | 428/172 X |

*Primary Examiner*—Ellis P. Robinson
*Assistant Examiner*—William P. Watkins, III
*Attorney, Agent, or Firm*—Finnegan, Henderson, Farabow, Garrett & Dunner

[57] ABSTRACT

A process for thermoforming a sheet of poly(methyl methacrylate) which has a reduced viscosity of at least 1.5, protected on at least one of its faces, by a ethylene polymer film, in intimate contact with it, and which has undergone a corona discharge treatment. The protective film of ethylene polymer has a density not exceeding 0.935 and a melt index lower than 1.0 g/10 min. The ethylene polymer film can be coated with a layer of acrylic adhesive after the ethylene polymer film has undergone the corona treatment.

9 Claims, No Drawings

THERMOFORMED POLY (METHYL METHACRYLATE) SHEETS WITH PROTECTIVE FILM

This application is a continuation of application Ser. No. 07/817,957, filed Jan. 8, 1992, now abandoned, which is a continuation of application Ser. No. 07/675,055, filed Mar. 25, 1991, now abandoned, which is a continuation of application Ser. No. 07/394,087, filed Aug. 15, 1989, now abandoned.

FIELD OF THE INVENTION

The present invention relates to a process for thermoforming poly(methyl methacrylate) sheets (PMMA sheets), leading to wrought products, in particular thermoformed shells for sanitaryware such as baths, shower trays, sinks, and the like. The thermoforming is carried out while the PMMA sheet carries, on at least one of its faces, a protective film of ethylene polymer. After the thermoforming, this film is generally left in place to protect the PMMA surface until the time of use by the consumer.

BACKGROUND OF THE INVENTION

Traditionally, the surface of the thermoplastic sheets, such as PMMA sheets, has been protected during their transport and their handling before the thermoforming by sticking sheets of paper on them. The adhesives used for this purpose have been generally water-soluble adhesives applied in solution form. However, it was necessary to apply these adhesives very uniformly to the surface of the sheet.

Since an application of an adhesive is very difficult to implement on an industrial scale, it was then proposed to replace the paper with an ethylene polymer film. This eliminates the need to use the adhesive. In the case of the protection of cast PMMA sheets, the ethylene polymer film is applied with the aid of hot rolls. However, when the PMMA sheet is freed from its ethylene polymer film before the thermoforming, the high static charge present on the sheets introduces the disadvantages that the people handling these sheets may be subjected to an electric shock. Also, dust is attracted more strongly into contact with the sheets.

To overcome these disadvantages, it has been proposed, in accordance with French Patent No. 2,349,425, to keep the polyethylene protection on the PMMA sheet during the thermoforming. This also provides the additional advantage of keeping this same protection on the wrought product. In many cases, and especially in that of the products intended to form sanitaryware, it was essential to apply a new protective coating because of the many handling operations which still remain to be performed before the fixture is installed on the consumer's premises This known process relates, therefore, to the thermoforming of a PMMA sheet, defined as having a reduced viscosity of at least 1.5 and, preferably, of at least 3.0, such as determined at 25° C. on a chloroform solution containing 1 g of the polymer in 1000 cm$^3$ of solution. The PMMA sheet is protected, on at least one of its surfaces, by a film, in intimate contact therewith, of a polyethylene which has been subjected to a corona discharge treatment (or corona treatment) at least on the face adhering to the PMMA sheet. In accordance with this known process, the protected PMMA sheet is heated to a temperature of at least 140° C., until it is softened by the heat. The heating is not sufficiently long for the sheet to be damaged by the changes induced in the polyethylene by the heat treatment to which it is subjected. The assembly, consisting of the sheet and its protection, is then deformed until the desired final shape is obtained. The polyethylene is still in intimate contact with the sheet. In accordance with this French patent, it is recommended to employ a film of polyethylene which has a melt flow index, determined according to ASTM Standard 1238-70, ranging from 1 to 4 g/10 min., the preference being given to the range from 2 to 3 g/10 min.

Apart from the conditions which it must fulfil to be capable of being used in the process indicated above, and which are sometimes the result of a compromise to satisfy at the same time the requirements of protection of the PMMA sheet, of temporary adhesiveness and of thermoforming, the ethylene polymer film must be capable, after the thermoforming, of retaining its integrity of appearance and of color until the time when it is to be pulled off. At that time, it must be capable of being pulled off easily, even after prolonged storage. Once pulled off, it must not have left any traces, nor have induced interfering microdeformations (micropits) on the PMMA sheet.

SUMMARY OF THE INVENTION

The inventors have therefore made attempts to improve the known process, especially with the aim of ensuring a better protection of the poly(methyl methacrylate) sheet using an ethylene polymer film.

The subject of the present invention is, therefore, a process for thermoforming a sheet of poly(methyl methacrylate) which has a reduced viscosity of at least 1.5. At least one of the sheet's faces is protected with a film in intimate contact with the sheet. The film is an ethylene polymer which has undergone a corona discharge treatment. The ethylene polymer is of a density not exceeding 0.935 and having a melt index lower than 1.0 g/10 min. The ethylene polymer film can also be coated with a layer of acrylic adhesive after the ethylene polymer film has been subjected to the corona treatment.

DETAILED DESCRIPTION OF THE PREFERRED EMBODIMENT

A "PMMA sheet" means here a sheet wherein at least the surface which will form the exposed surface of the finished product consists of a methyl methacrylate homopolymer or of a methyl methacrylate copolymer containing a major proportion, especially of at least 90 mol %, of methyl methacrylate units.

The term "ethylene polymer" includes, apart form the homopolymers, also copolymers of ethylene with minor quantities of copolymerizable monomers, which quantities are insufficient to give rise to any major difference in physical properties between the copolymer and the homopolymer. Thus, the ethylene polymer may contain minor proportions, in particular less than approximately 5% by weight, of monomers such as vinyl acetate or alkyl acrylates and methacrylates in which the alkyl group contains from 1 to 12 carbon atoms. In practice, whether an ethylene polymer can be employed will be determined by whether, after thermoforming of an assembly comprising the sheet and the ethylene polymer film, the film can be easily pulled off after the thermoforming, without leaving any traces of the film on the wrought product.

The density of the ethylene polymer is here determined according to ISO Standard R 1183. Its melt flow index is determined according to ISO Standard 1133.

According to the invention, the ethylene polymer film has a density that does not exceed 0.935 and, preferably, is higher than or equal to approximately 0.910. A preferred density range is the range from 0.915–0.925. If a film of an ethylene polymer with a density above 0.935 were used, then, when laying this film onto the PMMA sheet, it would be necessary to heat the interface to a temperature above approximately 90° C. Such a temperature would be incompatible with maintaining the surface quality of the PMMA. On the other hand, if a film of an ethylene polymer with a density of less than 0.910 is employed, there is a risk that this film may be slightly adhesive or tacky when cold, running the risk of resulting in a separation of the ethylene polymer films in the case where the PMMA sheets protected by their ethylene polymer films were to be stacked on top of each other for storage.

Furthermore, according to the invention, there is used a film of ethylene polymer whose melt index (MI) is lower than 1.0 g/10 min., and lies especially in the range from approximately 0.5 to approximately 0.9 g/10 min. The choice of an ethylene polymer which has an MI higher than 1, that is to say an ethylene polymer which has a lower molecular mass, would make it necessary, because of the low mechanical strength of the corresponding film, to employ an ethylene polymer film of high thickness. Such a film would run the risk of being incompatible with obtaining an appropriate adhesive nature. Equally, the choice of an ethylene polymer with an MI which is too low (below 0.5 g/10 min.), that is to say of an ethylene polymer having a very high molecular mass, would make both the laying of the ethylene polymer film onto the PMMA sheet and the thermoforming difficult, as a result of an excessive rigidity or excessively high flexural modulus of the film.

In the case where the protective film is coated with an acrylic adhesive, these density and melt index limitations relating to the ethylene polymer, although preferred, are not essential for achieving the objectives of the present invention.

The ethylene polymer film employed in the process of the invention has been subjected to a corona treatment which has led to an ethylene polymer film surface tension which is preferably higher than approximately $4 \times 10^{-2}$ N/m but lower than approximately $4.4 \times 10^{-2}$ N/m. If the surface tension of the ethylene polymer film were lower than $4 \times 10^{-2}$ N/m, it would be difficult to make this film adhere to the PMMA sheet unless the process was carried out at a temperature of at least 115° C. Such a temperature is completely incompatible with preserving the surface quality of the sheet. On the other hand, if this surface tension were higher than $4.4 \times 10^{-2}$ N/m, the film could be inseparable after thermoforming, owing to being too adhesive, even with the film applied to the sheet at a temperature below 80° C. and at a pressure which is not excessive.

In the case where the ethylene polymer film is employed while coated with the acrylic adhesive, it is desirable for the corona treatment to be such that the resulting surface tension of the ethylene polymer film is higher than $4.4 \times 10^{-2}$ N/m. This allows the layer of adhesive to be always kept in contact with the ethylene polymer film without producing a transfer onto the PMMA sheet.

Furthermore, after corona treatment, the ethylene polymer film preferably has a thickness of between 25 and 80 μm. It would be very difficult to apply onto the PMMA sheet an ethylene polymer film with a thickness of more than 80 μm, because it would lack flexibility, owing to its low melt index. However, this low melt index makes it possible to employ a film of a thickness which is as low as 25 μm.

In the case where the ethylene polymer film is made adhesive by the layer of acrylic adhesive, its thickness may be approximately 25 and 120 μm. Reinforced protection with the adhesive layer can be useful, for example, in the case of thermoformed products ducts of greater value, or if the PMMA to be protected has a matted or pebbled surface, as well as in the case where it is desired to have the ability of sticking the ethylene polymer film back onto the thermoformed article after it has been unstuck.

In the case where an ethylene polymer film coated with a layer of adhesive is employed, the adhesive is advantageously chosen from polyacrylates which have a glass transition point below approximately −20° C., especially poly($C_4$-$C_{12}$-alkyl acrylates) such as, for example, poly(butyl acrylate), poly(2-ethylhexyl acrylate) (2EHA), or poly(3,3,5-trimethylhexyl acrylate). Such adhesives are suitable because, as a result of their elastomeric nature, they are easy to apply onto the ethylene polymer sheet which has been subjected to the corona treatment, in the form of aqueous emulsions at a concentration of approximately 30–40% by weight of solids content and as a layer with a thickness of less than 10 μm, for example of the order of 5 μm. These adhesives are stable under the thermoforming temperature conditions.

The ethylene polymer film may be applied onto the PMMA sheet by various processes during which heat is applied either to one or to the other, in order that the ethylene polymer should be softened with a view to a good adhesiveness to the sheet at the time when pressure is applied to the sheet/film assembly. Thus, there may be mentioned the case where rolls, which are at a temperature of approximately 80° C., are applied with a sufficient pressure and for a sufficient time to make the ethylene polymer film adhere to the PMMA sheet. The film and the sheet are both delivered to the rolls at ambient temperature.

Furthermore, it may sometimes be useful to reduce the magnitude of the static charge which may be present when the protective film is ultimately removed form the wrought product, to employ a PMMA sheet to which an electrically conductive layer has been applied before the application of the ethylene polymer film. Materials which are suitable for forming such conductive layers are water-soluble cationic surface-active agents such as alkylpryidinium bromides, in aqueous solutions, which are easily applied onto the PMMA sheet and are dried before the application of the ethylene polymer film.

In accordance with a preferred thermoforming process, a PMMA sheet carrying its adhesive protective layer of ethylene polymer is heated up to at least 140° C, preferably up to at least 150° C., for example up to 200° C. The heating is carried out in a conventional apparatus such as an air oven or an infrared heating apparatus, until the sheet is in a suitable state for thermoforming. Then it is moved away from the source of heat before changes in the nature of the ethylene polymer give rise to a deterioration of the sheet surface.

To obtain a satisfactory product, it is desirable for the heating cycle to apply a sufficient heat treatment to allow the sheet to undergo the thermoforming, but without interrupting the intimate contact between the ethylene polymer film and the PMMA sheet. Any such interruption can result in surface damage or cause the ethylene polymer to adhere too firmly to the sheet or undergo a change whose nature makes it difficult to remove it cleanly from the sheet after cooling down to ambient temperature.

The thermoforming is then carried out by deforming the softened sheet at the same time as the adherent layer of ethylene polymer until the time when the unprotected surface comes into contact with a molding surface having the desired shape. Alternatively, the thermoforming is carried out by pressing a hot tool having the desired shape against the unprotected surface of the sheet until the time when the latter has acquired the desired shape.

The sheets can thus be deformed to form the wrought product according to the various traditional processes. For example, a reduced pressure or a pressure deforming the sheet without contact with the molding surfaces can be maintained. Alternatively, one can apply a pressure or of a reduced pressure for blowing or applying the sheet onto a molding surface.

The protective ethylene polymer layer remains in place throughout the thermoforming and is subsequently removed at the desired time, between the time when the wrought product cools and the time of the final use of this product.

The invention also relates to the wrought product made of PMMA having a reduced viscosity of at least 1.5. The PMMA is protected on at least one of its faces by a film, in intimate contact with the PMMA, of an ethylene polymer which has been subjected to a corona discharge treatment. The protective ethylene polymer film has a density not exceeding 0.935 and a melt index lower than 1.0 g/10 min. The ethylene polymer film can also be coated with a layer of acrylic adhesive after the film has been subjected to the corona treatment.

The following examples illustrate and do not limit the present invention.

EXAMPLE 1

The PMMA sheet employed is a sheet of sanitaryware grade PMMA (according to European Standard EN 198 (CEN-TC 86, January 1986)), obtained by casting polymerization, which has a reduced viscosity higher than 4, and a thickness of 5 mm.

The protective ethylene polymer film is a polyethylene film marketed by Norsolor under the name Lotrene FB 7000 (MI: 0.7 g/10 min.; density: 0.921). The film has a thickness of 70 μm and has undergone a corona treatment, which has resulted in a polyethylene surface tension of $4.2 \times 10^{-2}$ N/m.

The polyethylene film, which is unwound from a feed reel, is run continuously over a heated roll whose temperature is controlled to heat the film to 60°-80° C. The film is then applied onto one face of the PMMA sheet, also moving continuously, by means of a metal press roll with a rubber coating which makes the film adhere to the sheet and removes the blisters at the interface.

An identical device is provided for applying an identical polyethylene film onto the other face of the sheet. The films have an adhesion to the sheet which is approximately 0.4 N/cm.

The film/sheet/film composite is stored and then transported to the thermoforming site without any separation of the films being observed.

To obtain, for example, a bath shell by thermoforming, one of the films is first removed and the sheet/film composite thus obtained is subjected to a heating operation, in horizontal position. The polyethylene film faces upwards, in an air oven heated to a temperature of 180° C., for approximately 20 minutes.

The heated composite is transported to a vacuum molding chamber, where the sheet is adapted to the contour of the bath shell mold. Vacuum is applied so as to make the unprotected surface of the sheet come into contact with the mold surface.

After cooling, the thermoformed composite is taken out. The protective film has an adhesion to the PMMA sheet of 0.6 N/cm of tape. It is removed only later. It then comes off easily, leaving a faultless PMMA surface.

EXAMPLE 2

The procedure is as in Example 1, except that a sheet of sanitaryware grade PMMA is employed. The PMMA has a matt face and as a protective film remaining on the sheet during the thermoforming. A film of a polyethylene marketed by Norsolor under the name Lotrene FB 8,000 (MI: 0.8 g/10 min.; density: 0.924) is used and has a thickness of 80 μm. The ethylene film has undergone a corona treatment which has produced a surface tension of $4.6 \times 10^{-2}$ N/m. The ethylene film has been coated, on its face which was thus treated, with an adhesive layer of 6 μm of a poly(2-ethylhexyl acrylate). This polyethylene film is applied onto the matt face of the PMMA sheet.

The adhesive layer makes it possible to ensure an excellent adhesiveness of the polyethylene film to the PMMA sheet. When the film is pulled off, which is also done without difficulty, the surface of the PMMA looks faultless.

It will be apparent to those skilled in the art that various modifications and variations can be made in the present invention without deviating from the scope or spirit of the invention. Thus, it is intended tht the present invention covers the modifications and variations of this invention provided that they come within the scope of the following claims or their equivalents.

What is claimed is:

1. A wrought produce made of a thermoformed sheet of poly(methyl methacrylate) which has a reduced viscosity of at least 1.5, comprising:

a wrought sheet of poly(methyl methacrylate) protected, on at least one face thereof, by a film in intimate contact with the poly(methyl methacrylate), the film consisting essentially of an ethylene polymer having undergone a corona discharge treatment, wherein the protective ethylene polymer film has a density not exceeding 0.935, a melt index lower than 1.0 g/10 min and a surface tension between $4 \times 10^{-2}$ N/m and $4.4 \times 10^{-2}$ N/m, and wherein said protective ethylene polymer film is capable of being removed from intimate contact with said poly(methyl methacrylate) sheet without leaving any traces of said film or microdeformations on said sheet after thermoforming of said wrought product.

2. The wrought product according to claim 1, wherein the ethylene polymer has a density within the range of 0.910 to 0.935.

3. The wrought product according to claim 1, wherein the ethylene polymer film has a thickness of between 25 and 80 μm.

4. A product to be thermoformed made of a sheet of poly(methyl methacrylate) which has a reduced viscosity of at least 1.5, comprising a sheet of poly(methyl methacrylate) protected, on at least one face thereof, by a film in intimate contact with the poly(methyl methacrylate), the film consisting essentially of an ethylene polymer having undergone a corona discharge treatment, wherein the protective ethylene polymer film has a density not exceeding 0.935, a melt index of lower than 1.0 g/10 min and a surface tension between $4 \times 10^{-2}$ N/m and $4.4 \times 10^{-2}$ N/m and wherein said protective ethylene polymer film is capable of being removed from intimate contact with said poly(methyl methacrylate) sheet without leaving any traces of said film or microdeformations on said sheet after thermoforming of said product to be thermoformed.

5. The product to be thermoformed according to claim 4, wherein the ethylene polymer has a density within the range of 0.910 to 0.935.

6. The product to be thermoformed according to claim 4, wherein the ethylene polymer film has a thickness of between 25 and 80 μm.

7. The wrought product according to claim 1, thermoformed in the shape of a shell for sanitaryware fittings.

8. The wrought product according to claim 1, wherein the ethylene polymer film has a melt index of between 0.5 to 0.9 g/10 min.

9. The product to be thermoformed according to claim 4, wherein the ethylene polymer film has a melt index of between 0.5 and 0.9 g/10 min.

* * * * *